US008358597B2

(12) United States Patent
Fung (10) Patent No.: US 8,358,597 B2
(45) Date of Patent: Jan. 22, 2013

(54) METHOD FOR BUILDING SCALABLE ETHERNET SWITCH NETWORK AND HUGE ETHERNET SWITCH

(76) Inventor: Hei Tao Fung, Newark, CA (US)

(*) Notice: Subject to any disclaimer, the term of this patent is extended or adjusted under 35 U.S.C. 154(b) by 513 days.

(21) Appl. No.: 12/571,445

(22) Filed: Oct. 1, 2009

(65) Prior Publication Data

US 2011/0080855 A1    Apr. 7, 2011

(51) Int. Cl.
*H04L 12/28* (2006.01)
(52) U.S. Cl. .................. 370/256; 370/389; 370/392
(58) Field of Classification Search .......... 370/235, 370/236, 236.1, 236.2, 255, 256, 392, 396, 370/397, 389
See application file for complete search history.

(56) References Cited

U.S. PATENT DOCUMENTS

| | | | | |
|---|---|---|---|---|
| 6,018,523 A * | 1/2000 | Even | ............................. | 370/389 |
| 6,081,512 A * | 6/2000 | Muller et al. | ................. | 370/256 |
| 6,262,977 B1 * | 7/2001 | Seaman et al. | ............... | 370/256 |
| 6,697,339 B1 * | 2/2004 | Jain | ................................ | 370/256 |
| 6,771,610 B1 * | 8/2004 | Seaman | ....................... | 370/256 |
| 7,113,506 B1 * | 9/2006 | Cao | ................................ | 370/388 |
| 7,180,899 B2 * | 2/2007 | De Silva et al. | .......... | 370/395.31 |
| 7,188,364 B2 * | 3/2007 | Volpano | .......................... | 726/15 |
| 7,480,251 B2 * | 1/2009 | Foschiano et al. | ........... | 370/248 |
| 7,729,296 B1 * | 6/2010 | Choudhary | .................... | 370/256 |
| 7,738,456 B2 * | 6/2010 | Toebes et al. | ................ | 370/392 |
| 7,787,449 B2 * | 8/2010 | Cao | ................................. | 370/389 |
| 7,808,983 B2 * | 10/2010 | Joly | .............................. | 370/389 |
| 7,822,025 B1 * | 10/2010 | Joly | .............................. | 370/389 |
| 7,822,889 B2 * | 10/2010 | Arimilli et al. | ................. | 710/38 |
| 8,238,250 B2 * | 8/2012 | Fung | ............................. | 370/237 |
| 2003/0041136 A1 * | 2/2003 | Cheline et al. | ................ | 709/223 |
| 2005/0193103 A1 * | 9/2005 | Drabik | ......................... | 709/221 |

* cited by examiner

*Primary Examiner* — Dang Ton
*Assistant Examiner* — Brian O Connor (57) ABSTRACT

A method for building scalable Ethernet switch network and huge Ethernet switch is provided. The switch network is composed of a plurality of tiers of Ethernet switches forming a fat-tree topology. The bottommost tier connects to the end-stations. All switches except those in the top tier are typical IEEE802.1Q switches configured purposefully such that all packets from the end-stations are forwarded upstream to the top tier and are tagged with ingress port information. The top-tier switches possess a novel learning and forwarding capability such that a received packet is forwarded downstream to the destination end-station through one of a plurality of possible paths selected by a load balancing algorithm. The method can also be applied to build an Ethernet switch of a large number of ports.

10 Claims, 7 Drawing Sheets

METHOD FOR BUILDING SCALABLE ETHERNET SWITCH NETWORK AND HUGE ETHERNET SWITCH

FIELD OF THE INVENTION

The present invention relates to computer networking in general. In particular, the disclosure is directed to scalability of Ethernet switch.

BACKGROUND OF THE INVENTION

Recently due to the emergence of distributed computing at data centers, a scalable Ethernet switch network that has congestion alleviation capability becomes desirable. Connecting Ethernet switches in a fat-tree topology has been known to allow an Ethernet switch network to grow in scale. However, there are short-comings associated with that. For example, the switching paths among end-stations are static, and the network therefore is susceptible to network congestion without alleviation. Also, the switches in the network are quite homogeneous in terms of capabilities and the size of Filtering Database, which is the table of (Media Access Control) MAC address and port associations populated through the Learning Process, the observance of the source MAC addresses of packets received on each port. The administration of a large network is a daunting task. The invention discloses a method for building a scalable Ethernet switch network, and the same method can be applied to build a huge Ethernet switch. The present invention addresses the aforementioned short-comings.

BRIEF SUMMARY OF THE INVENTION

The present invention provides a method for building a scalable Ethernet network. Said scalable Ethernet network comprises a plurality of tiers forming a fat tree topology. The switches at the top tier comprise a plurality of downstream ports connecting to the switches at the tier immediately below. The switches at the tiers between the top tier and the bottommost tier comprise a plurality of upstream ports connecting to the switches at the tier immediately above and a plurality of downstream ports connecting to the switches at the tier immediately below. The switches at the bottommost tier comprise a plurality of upstream ports connecting to the switches at the tier immediately above and a plurality of downstream ports connecting to the end-stations.

In the current invention, there are two kinds of switches. All switches at the second topmost tier and lower tiers are referred to as lower-tier switches. All switches at the top tier are referred to as top-tier switches.

Lower-tier switches perform some simple functions in the current invention. Said functions comprise: when they receive a packet from any downstream port, they forward the packet to one of the upstream ports and append the ingress port information to the packet; when they receive a packet from any upstream port, they forward the packet to one of the downstream ports that can reach the destination end-station according to the destination port information, appended to the packet by a top-tier switch. Lower-tier switches can be typical IEEE 802.1Q compliant switches specially configured or simplified to perform said functions.

Top-tier switches can be considered as IEEE 802.1Q aware switches with novel Forwarding Process and Filtering Database. Top-tier switches maintain a novel Filtering Database, the association between the source MAC address and its ingress ports along the tiers. Top-tier switches perform a novel Forwarding Process such that based on the destination MAC address, said Filtering Database, and the membership of the destination port, a received packet is appended with the destination port information and forwarded to the selected downstream port. Top-tier switches replicate the packet when the destination comprises a set of downstream ports in the lowest-tier switches.

The advantages are the possibility of using lower-end and standard switches in most part of the network, concentrating the administration on a few switches, and using adaptive load-balancing to alleviate network congestion.

The aforementioned embodiments and other embodiments as well as objects and advantages of the present invention will become apparent from the following detailed description of various embodiments of the present invention read in conjunction with the accompanying figures. The detailed description and figures of the various embodiments of the present invention are merely illustrative of the present invention rather than limiting, the scope of the present invention being defined by the appended claims and equivalents thereof.

BRIEF DESCRIPTION OF THE DRAWINGS/FIGURES

The present disclosure will be understood more fully from the detailed description that follows and from the accompanying figures, which however, should not be taken to limit the disclosed subject matter to the specific embodiments shown, but are for explanation and understanding only.

DETAILED DESCRIPTION OF THE INVENTION

Figure 1:
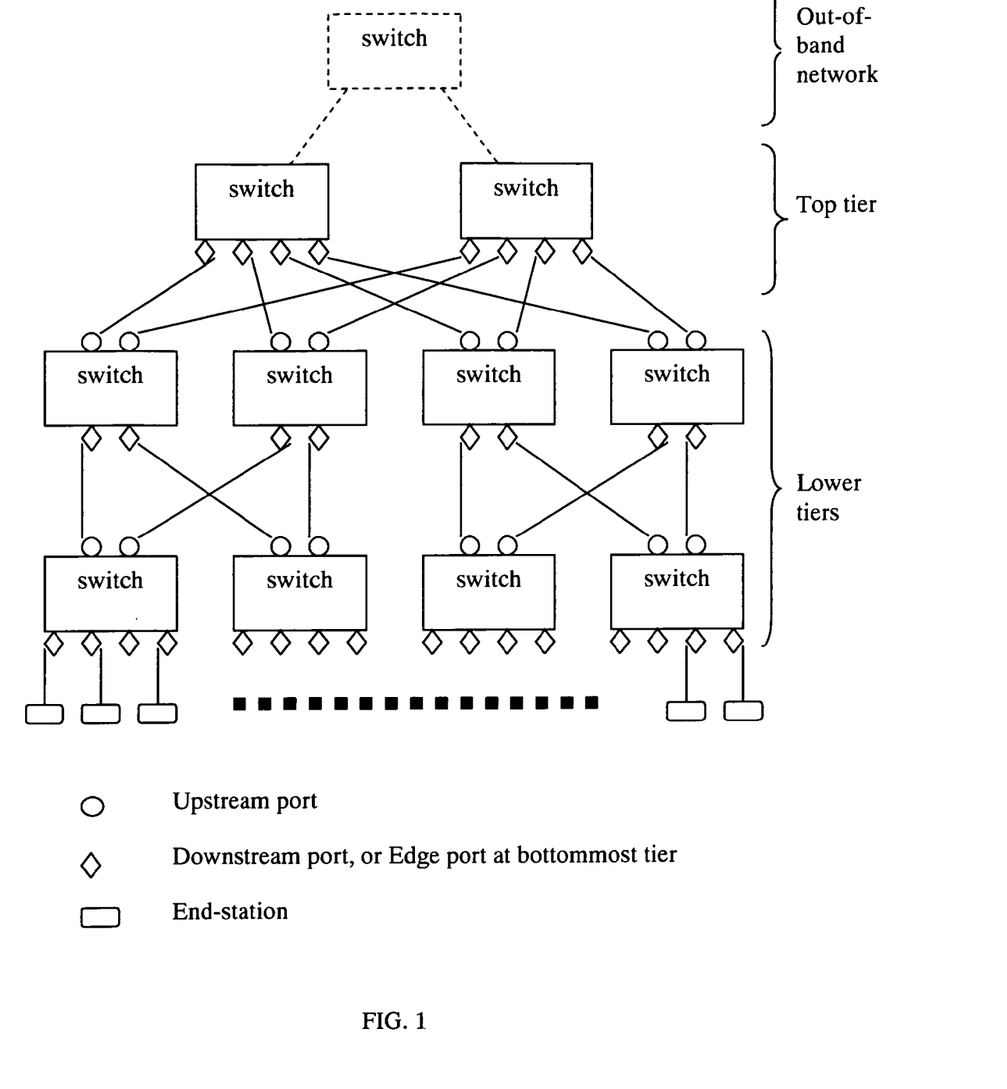
FIG. 1 is a diagram of an example of network switches in a fat-tree topology and also their relationship to an out-of-band management network.

The present invention provides a method for building a scalable Ethernet network. Said scalable Ethernet network comprises a plurality of tiers forming a fat tree topology. The switches at the top tier comprise a plurality of downstream ports connecting to the switches at the tier immediately below. The switches at the tiers between the top tier and the bottommost tier comprise a plurality of upstream ports connecting to the switches at the tier immediately above and a plurality of downstream ports connecting to the switches at the tier immediately below. The switches at the bottommost tier comprise a plurality of upstream ports connecting to the switches at the tier immediately above and a plurality of downstream ports connecting to the end-stations. For brief, the downstream ports attaching to end-stations are referred to as edge ports. FIG. 1 shows one example of a fat tree topology.

In the current invention, there are two kinds of switches. All switches at the second topmost and lower tiers are referred to as lower-tier switches. All switches at the top tier are referred to as top-tier switches.

Lower-tier switches perform some simple functions in the current invention. Said functions comprise: when they receive a packet from any downstream port, they forward the packet to one of the upstream ports and append the receiving port information to the packet; when they receive a packet from any upstream port, they forward the packet to one of the downstream ports that can reach the destination end-station according to the destination port information, appended to the packet by a top-tier switch. Lower-tier switches can be typical IEEE 802.1Q compliant switches specially configured to perform said functions, or they can be specially designed switches with simplified functionality of 802.1Q that perform said functions.

Figure 2:
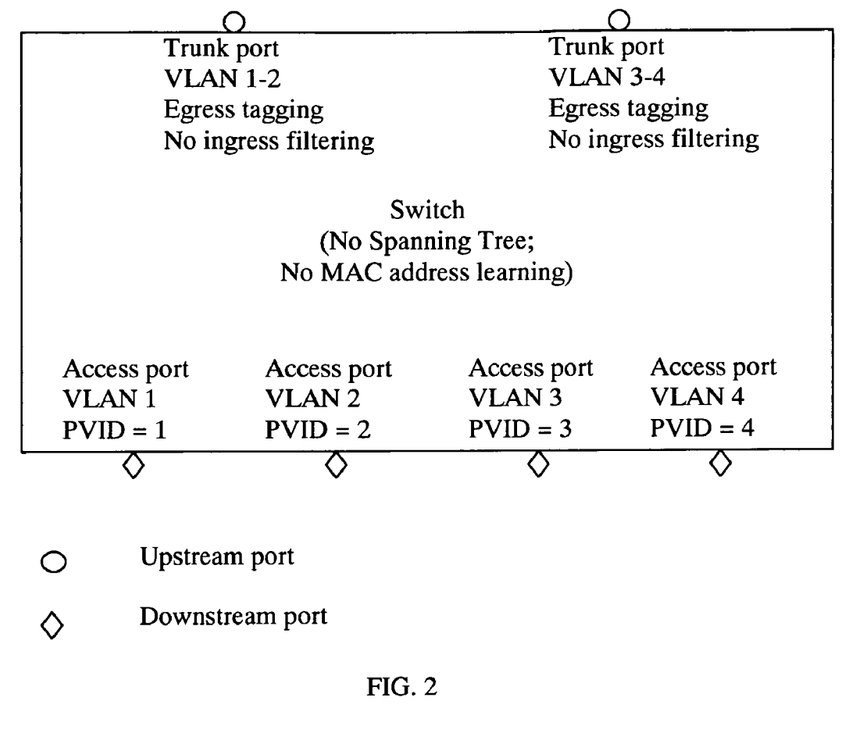
FIG. 2 is a diagram of one embodiment of a lower-tier switch, without using LAGs.

In one embodiment, the lower-tier switches are IEEE 802.1Q compliant switches specially configured to perform said functions. The downstream ports are configured as access ports. The Port VLAN Identifier (PVID) of each downstream port is unique; for example, the PVID equals the port number. The upstream ports are configured as trunk ports with egress tagging turned on for all (VLAN Identifiers) VIDs and ingress filtering disabled, hence admitting packets of any (Virtual Local Area Network) VLAN. The upstream ports divide up the set of VLANs assigned to the downstream ports. Spanning-Tree should be disabled and should not be needed so that all ports should be in Forwarding state. MAC address Learning may be disabled and should not be needed. See FIG. 2.

Figure 3:
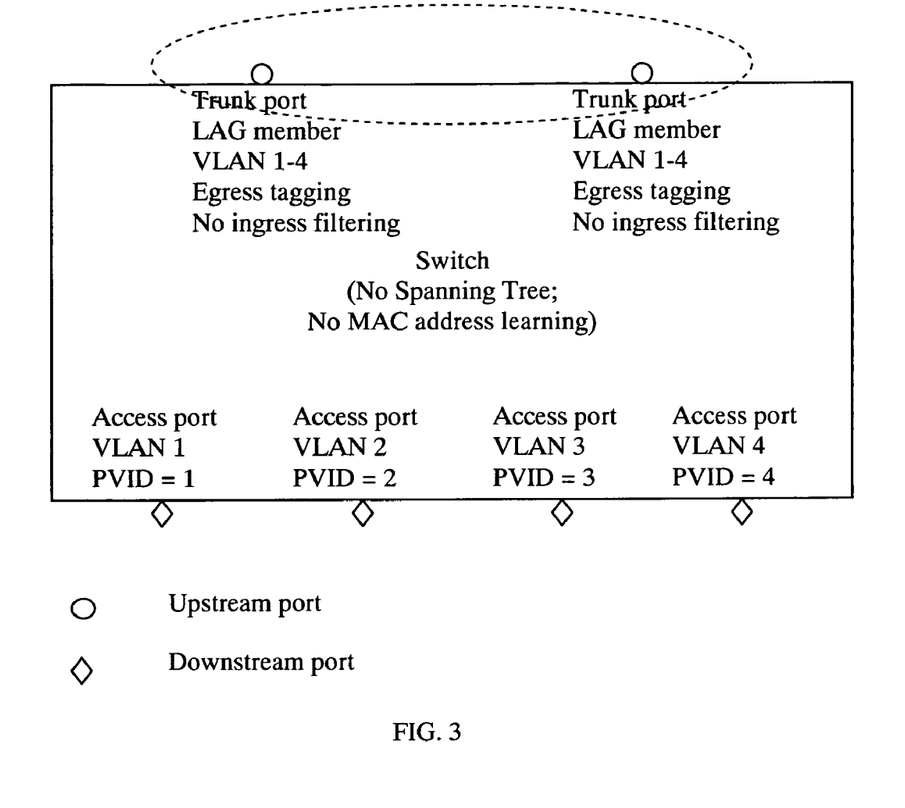
FIG. 3 is a diagram of another embodiment of a lower-tier switch, using LAGs.

In another embodiment, the lower-tier switches are IEEE 802.1Q compliant switches specially configured to perform said functions. The downstream ports are configured as access ports. The Port VLAN Identifier (PVID) of each downstream port is unique; for example, the PVID equals the port number. The upstream ports are configured as trunk ports with egress tagging turned on for all VIDs and ingress filtering disabled, hence admitting packets of any VLAN. The upstream ports are assigned into one or more link-aggregations (LAGs). (Note, however, that a special case is one upstream port per LAG.) If more than one LAGs are configured, the VLAN membership of the LAGs are configured as such that the LAGs divide up the set of VLANs assigned to the downstream ports. For load-balancing purpose, the upstream ports within the LAG should be connected to different switches at the tier immediately above. Spanning-Tree should be disabled and should not be needed so that all ports should be in Forwarding state. MAC address Learning may be disabled and should not be needed. See FIG. 3.

Said configurations achieve the following effects: a packet received on a downstream port is assigned a VID unique to the port; the packet is forwarded to one upstream port, and the egress packet is appended with an 802.1Q tag with the assigned VID representative of the ingress downstream port; the packet cannot be forwarded to any other upstream or downstream port because of VLAN membership; on the other hand, a packet received on an upstream port, whose 802.1Q tag is appended by the top-tier switch, is admitted and assigned to the VID in the outermost 802.1Q tag; the packet is stripped of the outermost 802.1Q tag; the packet is forwarded to the one and only one downstream port assigned to the VLAN matching the assigned VID of the packet; the packet cannot be forwarded to any other upstream or downstream port because of VLAN membership.

The ingress port information appended to the packet forwarded upstream is in the form a sequence of 802.1Q tags; in other words, there may be zero or more 802.1Q tags already in the received packet, but a new 802.1Q tag is inserted behind the Source MAC address field and ahead of any existing 802.1Q tag. As the VID in the 802.1Q tag uniquely identifies the ingress port of the switch at a tier, the sequence of VIDs derived from the sequence of 802.1Q tags identifies the edge port. Said sequence of VIDs also identifies the path the packet traversing upstream from end-station to a top-tier switch. Looking the other way round, when a top-tier switch that makes the forwarding decision forwards the packet downstream to the destination end-station through the lower-tier switches, the sequence of VIDs indicates the path the packet should be taken. It is a function of the top-tier switch to modify the sequence of 802.1Q tags of the received packet with proper VIDs resulting from its forwarding decision to direct the packet downstream through the selected path.

Figure 4:
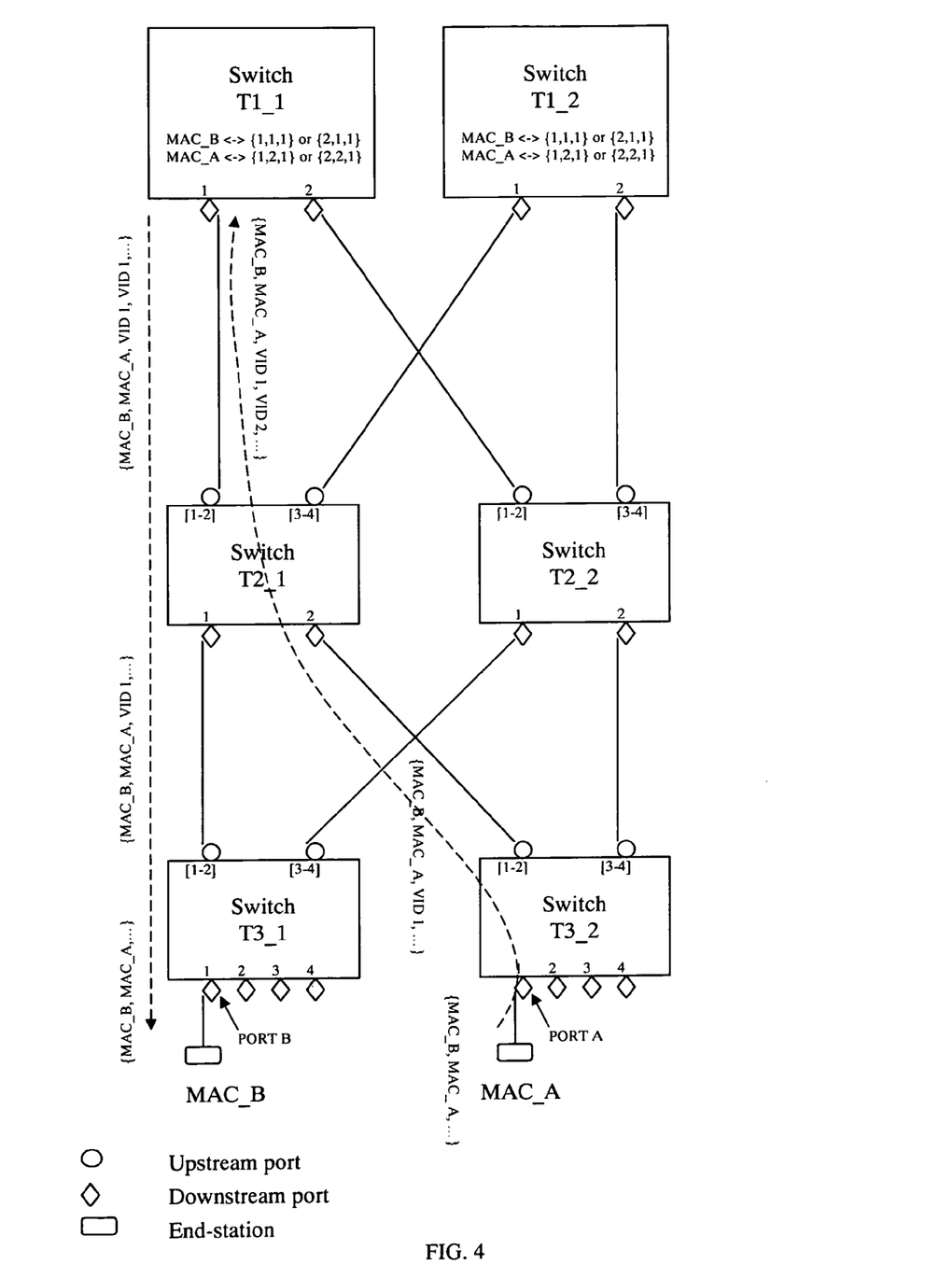
FIG. 4 illustrates the flow of a packet going upstream and then downstream in a network comprising lower-tier switches without using upstream LAGs.

For example, see FIG. 4. End-station with MAC address MAC_A is attached to an edge port A on switch T3_2. End-station with MAC address MAC_B is attached to an edge port B on switch T3_1. End-station MAC_A is sending a packet to end-station MAC_B. The packet received on the edge port A is assigned to VLAN 1. The packet finds its upstream port on VLAN 1 and is appended with an 802.1Q tag with VID 1. The packet is received at switch T2_1 and assigned to VLAN 2. The packet finds its upstream port on VLAN 2 and is appended with an 802.1Q tag with VID 2. The packet is received at switch T1_1 and assigned to VLAN 1. Therefore, the edge port where MAC_A is attached can be identified by {1,2,1}. The notation {a,b,c} signifies the VLANs assigned by the top-tier switch, the middle-tier switch, and the bottom-most-tier switch, respectively.

Because there are two paths from top-tier switches T1_1 and T1_2 to reach port A, port A can be identified by {1,2,1} and {2,2,1}. Similarly, port B can be identified by {1,1,1} and {2,1,1}. A packet sent from MAC_A to MAC_B uses one path {1,2,1} because of VLAN membership. When the packet reaches T1_1, T1_1 chooses one of the paths {1,1,1} and {2,1,1} determined by its load-balancing algorithm to forward the packet to MAC_B.

For example, the top-tier switch T1_1 selects the path represented by {1,1,1} for the packet sent from MAC_A to MAC_B. Switch T1_1 sends out the packet on the downstream port on VLAN 1, and the packet contains two 802.1Q tags, the outermost one with VID 1 and the inner one with VID 1. Switch T2_1 admits the packet due to ingress filtering disabled, assigns the packet to VLAN 1, removes the outermost tag, and sends it out on the downstream port on VLAN 1. Now the packet contains one 802.1Q tag with VID 1. Switch T3_1 admits the packet due to ingress filtering disabled, assigns the packet to VLAN 1, removes the tag, and sends it out on the edge port on VLAN 1. The packet, without any 802.1Q tag now, reaches end-station MAC_B.

Figure 5:
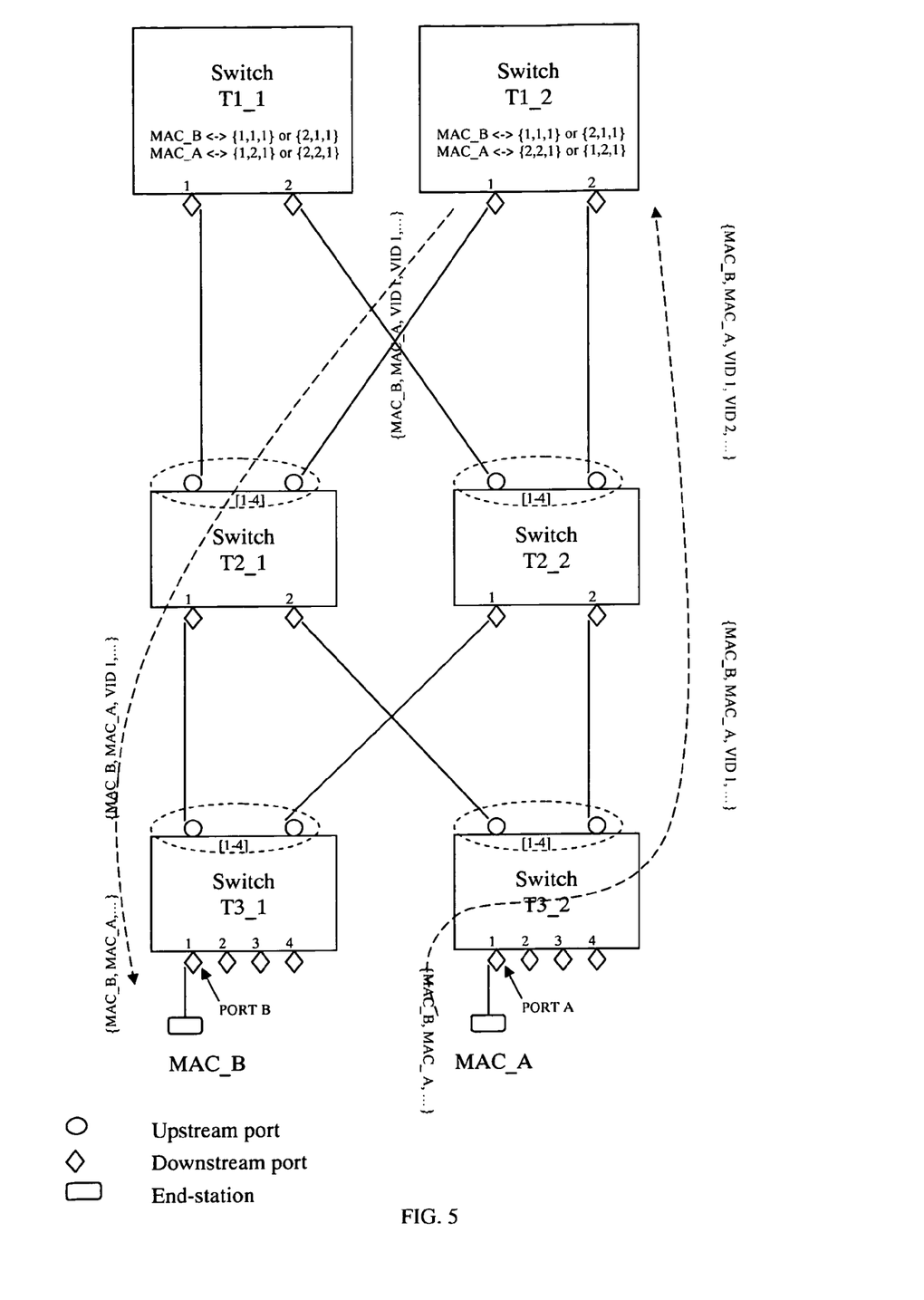
FIG. 5 illustrates the flow of a packet going upstream and then downstream in a network comprising lower-tier switches using upstream LAGs.

FIG. 5 is another illustration where lower-tier switches are putting upstream ports into LAGs. End-station with MAC address MAC_A is attached to an edge port A on switch T3_2. End-station with MAC address MAC_B is attached to an edge port B on switch T3_1. End-station MAC_A is sending a packet to end-station MAC_B. The packet received on the edge port A is assigned to VLAN 1. The packet finds an upstream port in the LAG by the LAG load balancing algorithm and is appended with an 802.1Q tag with VID 1. The packet is received at switch T2_2 and assigned to VLAN 2. The packet finds an upstream port in the LAG by the LAG load balancing algorithm and is appended with an 802.1Q tag with VID 2. The packet is received at switch T1_2 and assigned to VLAN 2. Therefore, the edge port where MAC_A is attached can be identified by {2,2,1}. The notation {a,b,c} signifies the VLANs assigned by the top-tier switch, the middle-tier switch, and the bottommost-tier switch, respectively. Switch T1_2 now decides to send out the packet on the downstream port on VLAN 1 using path {1,1,1}, and the packet contains two 802.1Q tags, the outermost one with VID 1 and the inner one with VID 1. Switch T2_1 admits the packet as the LAG is part of VLAN 1, assigns the packet to VLAN 1, removes the outermost tag, and sends it out on the downstream port on VLAN 1. Now the packet contains one 802.1Q tag with VID 1. Switch T3_1 admits the packet as the LAG is part of VLAN 1, assigns the packet to VLAN 1, removes the tag, and sends it out on the edge port on VLAN 1. The packet, without any 802.1Q tag now, reaches end-station MAC_B.

Top-tier switches in the present invention play the central role of making forwarding decision. They can be viewed as modified 802.1Q switches, or as a specialized Ethernet switch because they comprise novel methods.

Top-tier switches have their down-stream ports configured as access ports. Each down-stream port is assigned a unique PVID, as in the case of the lower-tier switches.

Top-tier switches comprise a novel Filtering Database, Learning Process, and Forwarding Process.

Top-tier switches maintain a novel Filtering Database, the association between the source MAC address and the identifier of the edge port. The port identifier is in the form of a sequence of VIDs.

Top-tier switches perform a novel Learning Process that extracts a sequence of VIDs from the sequence of 802.1Q tags in the received packet and populate said Filtering Database.

It is possible that a top-tier switch may receive only from a subset of end-stations on the network. Therefore, the top-tier switches need synchronization with one another to come up with Filtering Database with the full set of end-stations. In our preferred embodiment, said synchronization can be done using a protocol over an out-of-band network connecting the switches. Said out-of-band network operates independently from the switch network in the fat-tree topology. See FIG. 1. Said out-of-band network can also be used for managing the switches. The performance and scalability requirement for out-of-band network is often minimal.

When there are multiple paths from the top-tier switches to an edge port, there are multiple sequences of VIDs that represent the same edge port. Knowing the exact topology, the interconnections of ports of switches, the relationship among the sequences of VIDs of the same edge port are predictable. The load-balancing algorithm can take advantage of the predictable relationship. For example, referring to FIG. 4 again, even when one mapping of MAC_A and {1,2,1} is known, the mapping of MAC_A and {2,2,1} can be deduced.

The topology of the network can be provided administratively as the wiring among the switches are planned and executed by administrators. Alternatively, it can be discovered through exchanging information via a protocol on each port of on each switch. For example, the protocol can be IEEE 802.1AB or similar to that.

Group membership, the equivalent of 802.1Q VLAN membership in regular switches, can be applied on edge-ports. The group membership limits the packet forwarding scope, like the VLAN membership does.

Said group membership can be provisioned administratively on the top-tier switches because the top-tier switches perform the most significant forwarding decision in the network.

Top-tier switches perform a novel Forwarding Process. They look up the destination MAC address in the received packet in said Filtering Database and determine the destination edge-port accordingly.

In the case of a look-up hit, the identifier of the destination edge-port is obtained. Load-balancing algorithm may be performed to find the alternate sequence of VIDs representative of the destination edge-port, where the alternate sequence of VIDs represents an alternate path to the edge-port. The sequence of 802.1Q tags of the packet are modified using the resulting sequence of VIDs representative of the destination edge-port. Group membership of the destination edge-port is checked before sending out the packet.

In the case of a look-up miss, a multicast, or a broadcast, the packet has to be forwarded to multiple destination edge-ports assigned to the same multicast or broadcast group. Said Forwarding Process replicates the packet, and each replicated packet carries the sequence of VIDs representative of each individual destination edge-port of the same multicast or broadcast group.

Said Forwarding Process allows the ingress port on the top-tier switch to be the egress port because that port may be part of the best path to the destination edge port.

The aforementioned methods having been disclosed have a short-coming: the packet replication at top-tier switches in the case of broadcast or multicast. A solution to alleviate the short-coming is to use a special set of VIDs for broadcast and multicast traffic. Said special set of VIDs is included in the VLAN membership of the edge ports. The edge ports are configured as trunk ports with egress tagging disabled for all VIDs in this case. Top-tier switches just replicate and forward the packet once to each bottommost tier switch with innermost 802.1Q tag carrying one VID of said special set of VIDs. The packet is then assigned to that VID at the lower-tier switches and broadcasted or multicasted out on the edge ports according to the VLAN membership.

Figure 6:
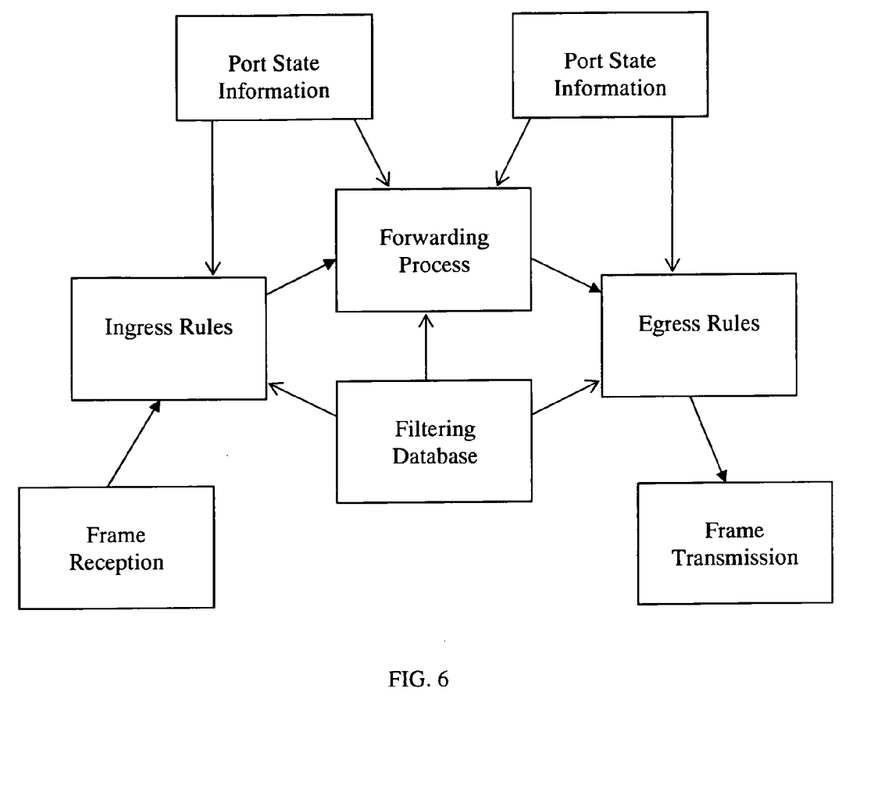
FIG. 6 shows a packet relay model described in IEEE 802.1Q standard.
Figure 7:
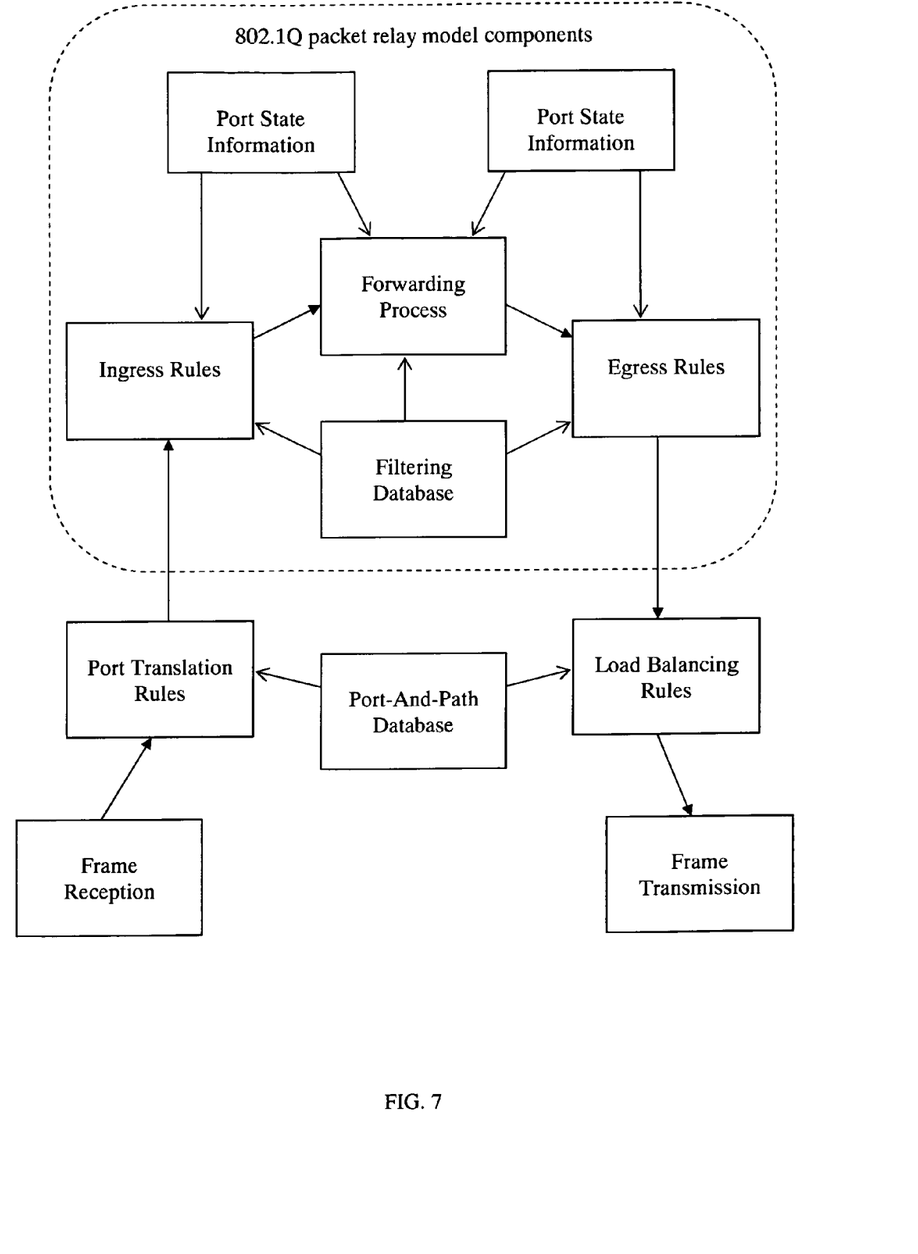
FIG. 7 shows a packet relay model of one embodiment where the invention is practiced.

In our preferred embodiment, a top-tier switch comprises a switch chip implementing said Learning Process, said Filtering Database, and said Forwarding Process by putting some new components in the 802.1Q standard Learning Process, Filtering Database, and Forwarding Process. FIG. 6 is the packet relay model described in the IEEE 802.1Q standard. FIG. 7 shows our preferred packet relay model, with new components comprising: Port Translation Rules, Port-And-Path Database, and Load Balancing Rules.

Port-And-Path Database comprises associations between edge port identifiers and their corresponding sequences of VIDs representing the paths that can reach the edge ports. The edge port identifiers are interface numbers that can be used in 802.1Q standard Ingress Rules, Learning Process, Forwarding Process, and Egress Rules. The interface numbers should uniquely identify all edge ports in the switch network as if all edge ports were on the same switch.

Port Translation Rules look up the edge port identifier from Port-And-Path Database by the sequence of VIDs extracted from the packet. The edge port identifier is fed into the 802.1Q standard Ingress Rules component. Also, Port Translation Rules may update the Port-And-Path Database.

The 802.1Q standard Ingress Rules, Learning Process, Forwarding Process, Filtering Database, and Egress Rules perform their standard functions as if the edge ports were directly attached.

Load Balancing Rules use the destination edge port identifier from the 802.1Q standard Egress Rules and look up for a sequence of VIDs representing the best path to the destination edge port from Port-And-Path Database by the destination edge port identifier. The packet's 802.1Q tags are modified as previously described. Multicasting or broadcasting of packets is handled as previously described.

Using the aforementioned methods, we can build an Ethernet network with a large number of edge ports. Said Ethernet network is loop-free and does not require Spanning Tree running on the switches. Said Ethernet network can be considered as one large Ethernet switch, and we call that Huge Ethernet Switch for brief. We can further attach Ethernet switches apart from end-stations to said Huge Ethernet Switch. Because of so, it may be desirable to have Huge Ethernet Switch run Spanning Tree and other IEEE link-layer protocols. All BPDUs or other link-layer PDUs received on the edge ports of said Huge Ethernet Switch can be treated in the same way as any packet, and they are appended with ingress port information forwarded to the top-tier switches. The top-tier switches run Spanning Tree and other link-layer protocols and send BPDUs and other link-layer PDUs out the edge ports.

Said Huge Ethernet Switch can also be implemented as a network-on-system. For example, the tier switches are replaced by tier switch modules; the interconnecting Ethernet cables are replaced by metallic wires; various PHY components between switch modules are removed; then the Huge Ethernet Switch becomes a switch system with a large number of ports.

In summary, there are several advantages of the current invention. Firstly, there is the possibility of reducing capital expenditure by leveraging standard, low-end Ethernet switches as the lower-tier switches. There is no need for Filtering Database in the lower-tier switches. There are few functionality requirements in the lower-tier switches. The number of lower-tier switches is much larger than the number of top-tier switches in a fat-tree topology. All Layer 2 to Layer 7 features may reside on the top-tier switches. Apart from building a scalable Ethernet switch network, when it comes to building a network-on-system Huge Ethernet Switch, the possibility of leveraging off-the-shelf switch chips is attractive. Secondly, administration tasks are concentrated on top-tier switches, and the number of top-tier switches is small, making the provisioning relatively easy. Thirdly, the load-balancing algorithm on top-tier switches can be made adaptive to congestion condition. For example, when a downstream port on a top-tier switch receives back-pressure signal, an alternate path is favored.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A method for building a scalable Ethernet switch network with a plurality of edge ports, connected to a plurality of end-stations, the method comprising:

creating by a processor a fat-tree topology including a plurality of Ethernet switches, arranged in tiers, the tiers including one top tier and at least one lower tiers, the top tier including at least one top-tier switches, the lower tiers including lower-tier switches, the lower-tier switches including downstream ports and upstream ports, wherein a top-tier switch of said at least one top-tier switches includes a database, the database storing mappings of a MAC address and path information, the MAC address belonging to one of said plurality of end-stations, the path information including a sequence of PVIDs (Port VLAN Identifiers), the sequence of PVIDs representing a sequence of said downstream ports for a packet to go out of said scalable Ethernet switch network from said top-tier switch of said at least one top-tier switches via said lower-tier switches;

configuring by the processor said downstream ports to be access ports;

assigning by the processor some VIDs (VLAN Identifiers), out of all VIDs, as PVIDs of said downstream ports such that said PVIDs of downstream ports are unique within each of said lower-tier switches;

configuring by the processor upstream ports to be trunk ports with egress tagging enabled for said all VIDs and with ingress filtering disabled;

disabling by the processor spanning tree and putting by the processor said downstream ports and said upstream ports in forwarding state; and performing a learning process and a forwarding process at said at least one top-tier switches using said database.

2. The method of claim 1, wherein said learning process at said at least one top-tier switches comprises installing in said database a mapping of said mappings of a MAC address and path information by using a source MAC address of the packet as said MAC address of said mapping of said mappings of a MAC address and path information and by deriving said sequence of PVIDs from a sequence of 802.1Q tags in the packet, the sequence of 802.1Q tags in the packet being inserted into the packet as the packet traverses from said lower-tier switches to said at least one top-tier switches.

3. The method of claim 1, wherein said forwarding process at said at least one top-tier switches comprises:

extracting a destination MAC address from the packet;

looking up from said database at least one matching mappings, of said mappings of a MAC address and path information, where said MAC address of each of said matching mappings matches said destination MAC address;

selecting a best matching mapping from said at least one matching mappings; and inserting a sequence of 802.1Q tags into the packet using said sequence of PVIDs of said best matching mapping.

4. The method of claim 3, wherein said forwarding process replicates the packet for each destination edge port, of said plurality of edge ports, when broadcast or multicast is called for.

5. An Ethernet switch system with a plurality of edge ports, connected to a plurality of end-stations, the Ethernet switch system comprising:

a plurality of Ethernet switch modules, arranged in tiers, forming a fat-tree topology, the tiers including one top tier and at least one lower tiers, the top tier including at least one top-tier switch modules, the lower tiers including lower-tier switch modules, the lower-tier switch modules including downstream ports and upstream ports, wherein said lower-tier switch modules are 802.1Q compliant switch modules whose configurations comprising:

configuring by a processor said downstream ports to be access ports;

assigning by the processor some VIDs (VLAN Identifiers), out of all VIDs, as PVIDs (Port VLAN Identifiers) of said downstream ports such that said PVIDs of downstream ports are unique within each of said lower-tier switch modules;

configuring by the processor upstream ports to be trunk ports with egress tagging enabled for said all VIDs and with ingress filtering disabled; and disabling by the processor spanning tree and putting by the processor said downstream ports and said upstream ports in forwarding state, wherein a top-tier switch module of said at least one top-tier switch modules includes a database, the database storing mappings of a MAC address and path information, the MAC address belonging to one of said plurality of end-stations, the path information including a sequence of PVIDs, the sequence of PVIDs representing a sequence of said downstream ports for a packet to go out of said Ethernet switch system from said top-tier switch module of said at least one top-tier switch modules via said lower-tier switch modules.

6. The Ethernet switch system of claim 5, wherein said configurations further comprising assigning by the processor said trunk ports to one or more LAGs (Link Aggregations).

7. The Ethernet switch system of claim 5, wherein said top-tier switch module of said at least one top-tier switch modules performs a learning process comprising:

installing in said database a mapping of said mappings of a MAC address and path information by using a source MAC address of the packet as said MAC address of said mapping of said mappings of a MAC address and path information and deriving said sequence of PVIDs from a sequence of 802.1Q tags in the packet, the sequence of 802.1Q tags in the packet being inserted into the packet as the packet traverses from said lower-tier switch modules to said top-tier switch module of said at least one top-tier switch modules.

8. The Ethernet switch system of claim 5, wherein said top-tier switch module of said at least one top-tier switch modules performs a forwarding process comprising:

extracting a destination MAC address from the packet;

looking up from said database at least one matching mappings, of said mappings of a MAC address and path information, where said MAC address of each of said matching mappings matches said destination MAC address;

selecting a best matching mapping from said at least one matching mappings considering load-balancing; and inserting a sequence of 802.1Q tags into the packet using said sequence of PVIDs of said best matching mapping.

9. The Ethernet switch system of claim 5, wherein said top-tier switch module of said at least one top-tier switch modules replicates the packet for each destination edge port, of said plurality of edge ports, when broadcast or multicast is called for.

10. The Ethernet switch system of claim 5, wherein said mappings of a MAC address and path information comprise mappings from MAC addresses of said plurality of end-stations to said plurality of edge ports and mappings from said plurality of edge ports to said path information.

* * * * *